United States Patent
Cho et al.

(10) Patent No.: US 7,145,496 B2
(45) Date of Patent: Dec. 5, 2006

(54) AUTOFOCUS METHOD BASED ON SUCCESSIVE PARAMETER ADJUSTMENTS FOR CONTRAST OPTIMIZATION

(75) Inventors: Kwang M. Cho, Rancho Palos Verdes, CA (US); Leo H. Hui, Alhambra, CA (US)

(73) Assignee: Raytheon Company, Waltham, MA (US)

( * ) Notice: Subject to any disclaimer, the term of this patent is extended or adjusted under 35 U.S.C. 154(b) by 247 days.

(21) Appl. No.: 10/996,246

(22) Filed: Nov. 23, 2004

(65) Prior Publication Data

US 2006/0109163 A1    May 25, 2006

(51) Int. Cl.
    *G01S 13/90*    (2006.01)
(52) U.S. Cl. ............... 342/25 R; 342/25 D; 342/25 F; 342/161; 342/196
(58) Field of Classification Search .............. 342/25 R, 342/25 D, 25 F, 90, 196, 192, 194, 161
    See application file for complete search history.

(56) References Cited

U.S. PATENT DOCUMENTS

| | | | |
|---|---|---|---|
| 5,184,134 A * | 2/1993 | Niho et al. ................ | 342/25 D |
| 6,037,892 A * | 3/2000 | Nikias et al. .............. | 342/25 F |
| 6,603,424 B1 * | 8/2003 | Abatzoglou ............... | 342/25 R |
| 6,873,285 B1 * | 3/2005 | Carrara et al. ............. | 342/25 R |
| 6,987,479 B1 * | 1/2006 | Hansen et al. ............. | 342/25 F |
| 7,038,612 B1 * | 5/2006 | Chow et al. ............... | 342/25 F |

* cited by examiner

Primary Examiner—Thomas H. Tarcza
Assistant Examiner—Isam Alsomiri
(74) Attorney, Agent, or Firm—Leonard A. Alkov; Karl A. Vick

(57) ABSTRACT

A radar on a moving platform generates an initial synthetic aperture (SAR) image of a scene from a sequence of periodic pulse returns approximately motion compensated. The SAR image is formed from pixel intensities $z_n(x,y)$ within a x,y extent of the initial synthetic aperture image. Targets are selected from the initial synthetic aperture image using a sliding window, computing a first entropy for the selected targets, and sorting the targets using the first entropy to obtain a target list having target elements, then concatenating the target elements to form a data matrix compatible in the azimuth dimension with a Fast Fourier Transform.

A phase correction for autofocus is iteratively computed and applied to the initial synthetic aperture image using an inner loop, a mid loop and an outer loop. The phase correction is expressed using an orthogonal polynomial having a plurality n consecutive terms $a_n$, $a_2$ denoting a quadratic term, and $a_N$ denoting a last order term. The outer loop, using an L index, calculates an outer loop $E_L(a_2)$ entropy for the quadratic term and an outer loop $E_L(a_N)$ entropy for the last order term. Iterations within the outer loop continue until $E_L(a_2)-E_L(a_N)$ is less than an outer loop tolerance.

Similarly, the mid loop, and inner loop continue until the computation of their respective entropies meet a pre-set tolerance. The inner loop entropy uses a Golden Section search for computing the inner loop entropy.

12 Claims, 5 Drawing Sheets

AUTOFOCUS METHOD BASED ON SUCCESSIVE PARAMETER ADJUSTMENTS FOR CONTRAST OPTIMIZATION

This invention was made with Government support under Contract No. F19628-00-C-0100 awarded by the Department of the Air Force. The Government has certain rights in this invention.

BACKGROUND OF THE INVENTION

1. Field of Invention

This invention is in the field of autofocus methods for Synthetic Aperture Radar (SAR) imaging.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses. These pulses are from a relatively small antenna on a moving platform. As the platform moves, the information contained in the pulses is combined to arrive at a high resolution SAR image.

The plurality of returns creating a SAR image generated by the transmitted pulses along a presumed known path of the platform make up a frame length. Theoretically, during the frame length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the frame length.

The plurality of pulses transmitted during an SAR frame length, when coherently combined and processed, result in image quality comparable to a longer antenna, corresponding approximately to the "length" traveled by the antenna during the frame length. The clarity of a SAR image is in many respects dependent on the quality of the motion compensation applied to each radar return prior to SAR image computation. Motion compensation shifts the phase of each radar sample (typically an I+jQ complex quantity derived from an analog to digital converter) in accordance with the motion in space of the moving platform. The SAR imaging process depends on the coherent, phase accurate summing of all radar returns expected within a frame.

For certain applications the accuracy of the motion compensation applied to each radar A/D sample is insufficient. For more accurate phase alignment accuracy autofocus methods are used. Autofocus methods typically use radar returns of a SAR image itself in an attempt to phase align radar return samples to accuracies better than those available from motion compensation alone.

The Map Drift Method is an example of an autofocus method of the prior art and is described by C. E. Mancil and J. M. Swiger in *A Map Drift Autofocus technique for Correlating High Order SAR Phase Errors(U)* 27$^{th}$ Annual Tri Service Radar Symposium Record, Monterey, Calif. June 1981 pp 391–400. Here, the estimation of quadratic error terms, the errors typically computed using autofocus techniques, is arrived at by dividing the aperture in the spatial frequency domain into two sub-apertures. An estimate of the relative shift of the two maps is computed to arrive at the quadratic error terms. Higher order terms can be computed by dividing the aperture into sub-apertures of smaller size and estimating relative image shifts for each sub-aperture. However, as the order of the phase error increases, and the sub-apertures get smaller, the estimated phase error tends to lose accuracy because of the reduced Signal to Noise Ratio (SNR). Because of this fundamental limitation, the Map Drift Method is limited to the case of low order corrections.

For high order phase corrections, another example of the prior art is applied. This is the Phase Gradient Autofocus (PGA) method, as described by D. E. Wahl, et al, *Phase Gradient Autofocus—A Robust Tool for High Resolution SAR Phase correction*, IEEE Transactions on Aerospace Electronic Systems, vol 30, pp 827–834, March 1994. The PGA method is based on the estimation of differential phase error of isolated point targets. Estimation accuracy is improved by averaging estimates from multiple point like targets. Because of the requirement of point like targets, PGA fails where there are no point like targets to be used with this method.

Both Map Drift and PGA methods lack metrics to determine the quality of the phase error estimates computed by each method.

Yet another approach in the prior art is based on SAR image quality. Because image quality improvement through phase error correction is related to the improvement in contrast or sharpness of the SAR image, optimized phase error estimates can be computed from improvements in the contrast/sharpness of the SAR image. An example of this iterative approach is described by L. Xi, L Gousui and J. Ni in *Autofocusing ISAR Images based on Entropy Minimization* IEEE Transactions on Aerospace Electronic Systems, vol 35, pp 1240–1252, October 1999. This autofocus technique, called stage by stage approaching algorithm (SSA) is based on entropy minimization and can provide an estimation of very high order phase errors. However, the computational requirements of SSA is prohibitively intense for SAR data, thus impractical with current airborne computer technology.

SUMMARY OF THE INVENTION

Above limitations are reduced and SAR images are improved by an autofocus method and radar. Said radar is on a moving platform for generating a focused synthetic aperture image of a scene from a sequence of periodic pulse returns from said scene, said pulse returns approximately motion compensated for the motion of said moving platform with respect to said scene. Said radar comprises: an analog to digital converter for converting said pulse returns into a digital stream and a computer for:

receiving said digital stream;

approximately phase aligning said pulse returns from said scene with respect to the motion of said moving platform to generate an initial synthetic aperture image, said initial synthetic aperture image formed from a plurality of pixel intensities $z_n(x,y)$ within a x,y extent of said initial synthetic aperture image;

selecting targets from said initial synthetic aperture image using a sliding window, computing a first entropy for said targets, and sorting said targets using said first entropy to obtain a target list having target elements;

concatenating said target elements to form a data matrix compatible in the azimuth dimension with a Fast Fourier Transform;

iteratively computing a phase correction to be applied to said initial synthetic aperture image using an inner loop, a mid loop and an outer loop, said phase correction expressed using an orthogonal polynomial having a plurality n consecutive terms $a_n$, $a_2$ denoting a quadratic term, and $a_N$ denoting a last order term of said consecutive terms of said orthogonal polynomial;

said outer loop, using an L index, calculating an outer loop $E_L(a_2)$ entropy for said quadratic term and an outer loop $E_L(a_N)$ entropy for said last order term, iterations within said outer loop continuing until $E_L(a_2)-E_L(a_N)$ is less than an outer loop tolerance;

said mid loop, using said n as an index, calculating a mid loop entropy $E_L(a_{n-1})$ and a mid loop entropy $E_L(a_n)$, for two of said consecutive order terms, iterations within said mid loop continuing until $E_L(a_{n-1})-E_L(a_n)$ is less than a mid loop tolerance;

said inner loop, using said n as an index, calculating an inner loop entropy $E_L(a_{n,m-1})$ and an inner loop entropy $E_L(a_{n,m})$ said inner loop iteration continuing until $E_L(a_{n,m-1})-E_L(a_{n,m})$ is less than an inner loop tolerance;

applying said phase correction to said initial synthetic aperture image to obtain a focused synthetic aperture image.

The inner loop entropy uses a Golden Section search for said inner loop entropy.

A location of minimum entropy point is found using said Golden Section Search.

An initial synthetic aperture image formed from said plurality of pixel intensities $z_n(x,y)$ is smoothed by convolving said plurality of pixel intensities with a window of 1's, thereby obtaining a smoothed pixel intensity, $I_n(x,y)$. The smoothed pixel intensity is used to compute a normalized intensity $\hat{I}(x,y)$ from $$\hat{I}(x, y) = \frac{|I_n(x, y)|^2}{\sum_y \sum_x |I_n(x, y)|^2}$$

The normalized intensity is used to compute optimal coefficients $a_{n,opt}$ for said orthogonal polynomial to obtain a minimum image entropy using:

$$a_{n,opt} = \underset{a_n}{\operatorname{argmin}}\left[-\sum_y \sum_x \hat{I}_n(x, y) \cdot \ln(\hat{I}(x, y))\right]$$

DETAILED DESCRIPTION OF THE INVENTION

The present invention describes an autofocus method for SAR images, called successive parameter adjustment (SPA) based on successive search of parameters of an orthogonal (Legendre) polynomial for best SAR image contrast and sharpness. Unlike the prior art PGA method, SPA can be applied to a SAR scene without point like targets. Unlike SSA, SPA allows choosing a balance between computational requirements and performance by adjusting the number of test image samples, and tolerance to stop iterations. SPA is also applicable for the case of the spatially variant phase error that varies with target position because local image samples for image quality measurements can be selected with fewer constraints for the estimation of the phase error that varies with target position.

Another important feature of SPA is its applicability where there are pulse drops, i.e. missing pulses during an aperture (frame) forming a SAR image. This flexibility is because SPA is based on fitting phase error using an orthogonal polynomial not locally, but globally over the whole aperture, thus tolerant of data missing from a few pulses.

Figure 1:
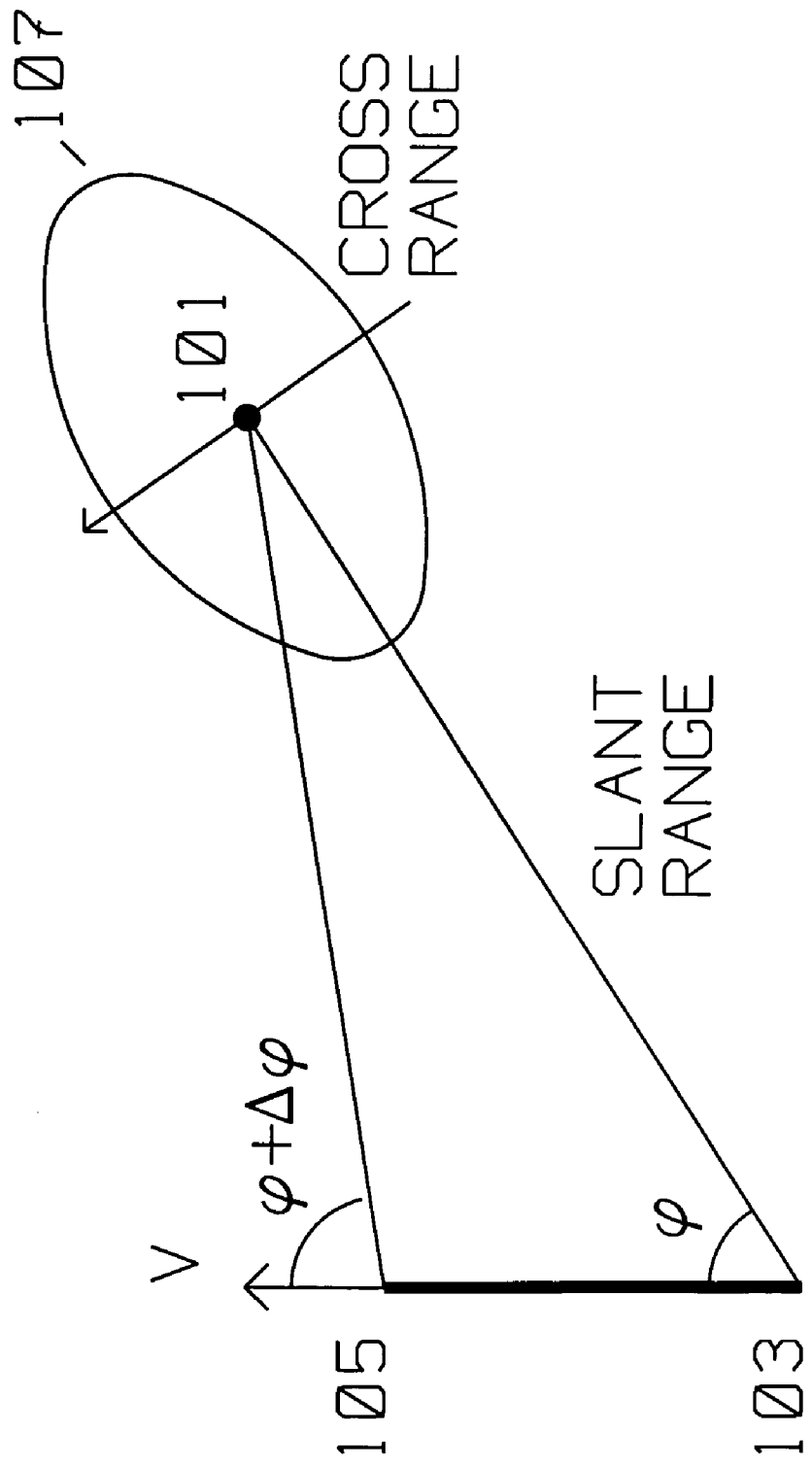
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during the frame length, and includes target area 101. Similarly, the antenna receive pattern covers area 107, and includes target area 101. Radar pulses are transmitted and corresponding returns received at many points during the frame length between position 103 and position 105.

Another alternative during SAR operation is "search" mode. Here, a strip of ground is covered by a moving platform generating a SAR image as it progresses along its path. SPA is applicable to both type of SAR radars. Both types of SAR radar are well known in the art and are described, for example, by W. G. Carrara, et al, in *Spotlight Synthetic Aperture Radar*, Artech house, 1995, incorporated herein be reference in its entirety.

Motion compensation is the process of digital correction of radar phase error for each radar return in a SAR frame forming a SAR image due to the change in position of scatterers relative to the moving platform as it acquires radar returns. The motion of the moving platform with respect to a focus point is typically measured using accelerometers coupled to GPS/INS systems. Motion compensation is performed in an airborne processor on each I/Q sample of a radar return. The exact form of motion compensation depends on the method used to compile the SAR image from the radar returns. Residual phase error is the phase error present after motion compensation has been taken into account. Residual phase error from various sources, such as uncompensated sensor motion or atmospheric effects, results in degraded SAR image quality. The reduction of uncompensated phase error is the goal of SPA in this invention.

SPA Autofocus Overview

This section gives an overview of SPA method. It is followed by details of each step of SPA.

The goal of SPA is to estimate the (residual) phase error in spatial frequency domain so as to improve the SAR image i.e. estimate the phase error that provides the best image quality when corrected.

SPA models the unknown phase error using an orthogonal polynomial (Legendre). The orthogonal polynomial parameters are estimated. SPA finds the orthogonal polynomial that fits well the phase error of a sequence of returns forming the SAR image. The orthogonal polynomial is then used to generate the phase error correction for radar returns over the entire SAR image.

One aspect of the method is to select an orthogonal polynomial (Legendre) that fits the residual phase error to be estimated for improved image contrast. Another aspect is the definition of image quality, generally represented by image contrast and sharpness.

One aspect of SPA is a search to determine the parameters of the orthogonal polynomial successively from low to high order. The optimum parameter value for each order term is determined through a one dimensional search. This one dimensional search is conducted for SPA in accordance with Golden Section (GS) search method described by G. C. Temes and S. K. Mitra in *Modern Filter Theory and Design* New York, John Wiley and Sons, 1973. Entropy is used for the contrast metric for optimization as in *Autofocusing of ISAR Images Based on Entropy Minimization* cited above with the goal of minimizing entropy when the estimated phase error correction modeled by the orthogonal polynomial is applied.

Where there are large higher order phase errors, local minimums can occur in the entropy curve and this results in poor phase error estimation by low order terms. Typically, high order terms generate discrete harmonics in the sidelobe region. Thus, when estimating low order terms, the effect of high order terms are suppressed using low pass filtered pixel intensity for entropy calculation. The local minimum in the calculated entropy is eliminated using a sliding window for smoothed intensity.

A Legendre orthogonal polynomial is used for the phase error model with the maximum order determined by comparing entropy change from one order to the next higher one with preset tolerance. Global solution is not obtained by searching all order terms of the polynomial in a single loop since there is no exact one to one correspondence between the best polynomial fit to the phase error and the best quality image metric. Therefore, the parameter search is repeated from low to high order in multiple loops. Typically, acceptable results arise after the second or third loop. Computational requirements for SPA entropy are reduced by using test images with strong intensity and high contrast, concatenated before transforming to the spatial frequency domain.

1) Method Summary.

Figure 2:
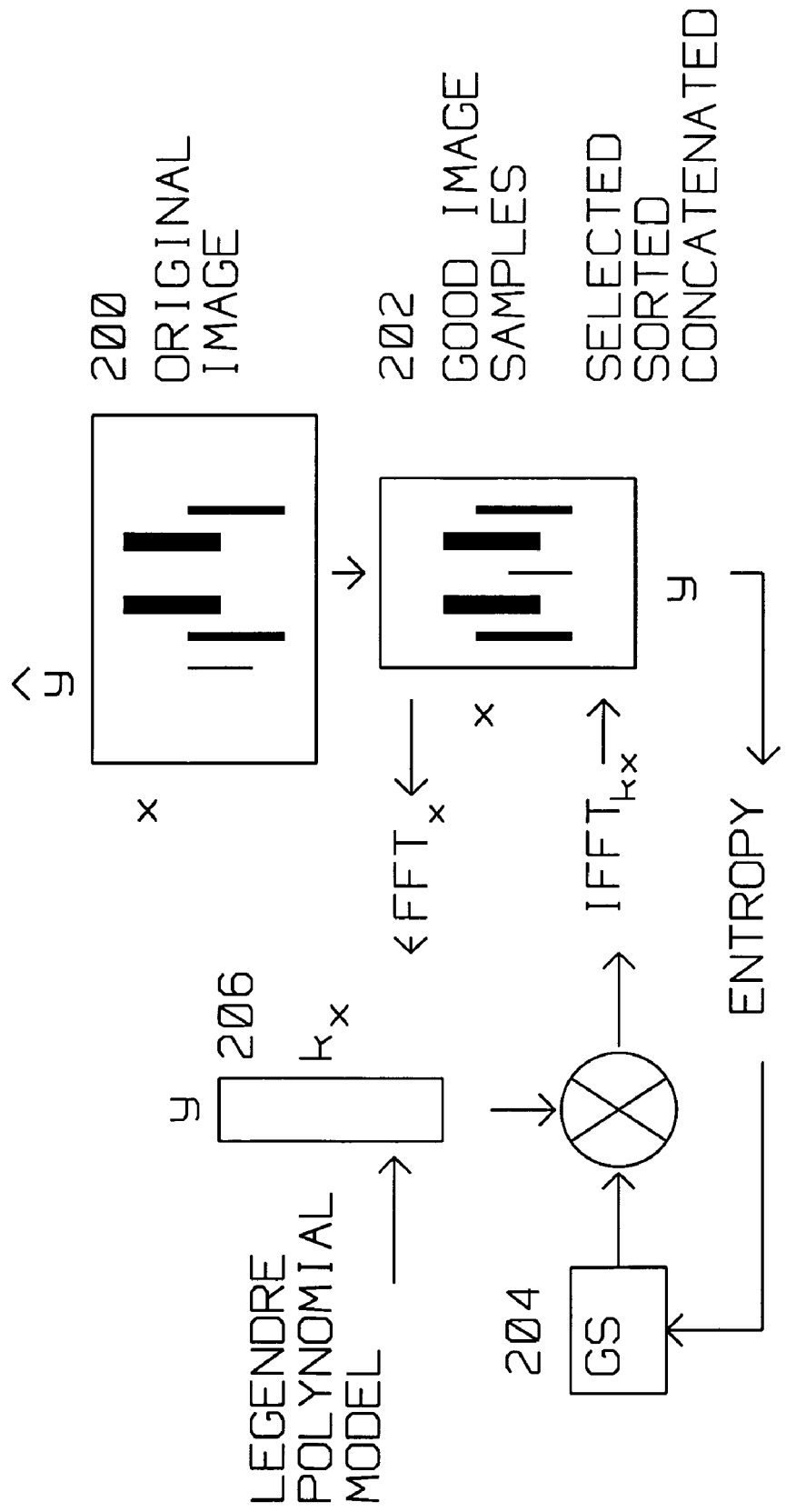
FIG. 2 shows a conceptual summary of the SPA auto focus method of this invention.

FIG. 2 gives an overall outline of the SPA method. The first step in SPA is the extraction of image data 202 from the original image 200, as shown in FIG. 2. The extracted portion 202 has many pixels with strong intensity and high contrast. The good image samples are selected from the original image 200, then sorted and finally concatenated to generate a list of good image sample 202. Selected targets can be any length and they are concatenated up to the length limited by the desired FFT size, with the remaining spaces zero filled (filled with zeros).

Parameter optimization, an aspect of SPA, requires numerous iterations of conversion from spatial frequency domain ($k_x$) to spatial domain (x). Because of these numerous iterations, only good selected image samples 202 are used for computational efficiency. Within 202, targets with extended length in the x direction are selected from original image 200 first based on intensity. Next, the selected targets are sorted in order of increasing entropy. The number of range bins are limited by selecting only those of interest, avoiding the computational load for those outside the area of interest. Targets smeared by wind, such as trees, are excluded for the measurement of contrast metrics. Denoting the number of range bins before target selection as $\hat{y}_{max}$ and the number of range bins after target selection as $y_{max}$, it is always the case that $y_{max} << \hat{y}_{max}$.

Using above principles, a preferred way for target data selection for contrast optimization applicable to SPA from original image 200 is given by the steps of:

A) Convolving $A=|I+jQ|^2$, where I and Q are the complex components of the image, A is the amplitude, with windows of 1's;

B) Selecting those range bins where $A > k \cdot \overline{A}$

C) Compute entropy of selected targets

D) Order targets from Minimum to Maximum Entropy

E) Concatenate into good image samples 202

F) Select desired number of range bins from the good image samples for further processing.

The resulting target data selection is converted to Azimuth Spatial Frequency Domain ($k_x$) using a Fast Fourier Transform (FFT) in FIG. 2 by $FFT_x$.

2) Legendre Orthogonal Polynomial

In FIG. 2, the result of $FFT_x$ is input into the Legendre orthogonal polynomial model 206. The results from polynomial model 206 are combined with results from Golden Search 204. A reverse FFT, $IFFT_{kx}$ returns the processed results into a SAR image.

Denote the phase to be applied in spatial frequency domain $k_x$ by $\Delta\theta(k_k)$, and express it using Legendre orthogonal polynomial of order N as $$\Delta\theta(k_k) = \sum_{n=2}^{N} a_n P_n(k_k)$$

Here, the azimuth frequency variable, $k_x$, is normalized so that all the aperture samples are between $(-1)$ and $(1)$. To calculate $\Delta\theta(k_k)$ for any trial value of $a_n$, read $P_n(k_k)$ from a lookup table of pre-calculated values as given by recursive formula:

$$P_0(k_x) = 1$$
$$P_1(k_x) = k_x$$
$$P_n(k_x) = \frac{2n-1}{n} \cdot (k_x) \cdot P_{n-1}(k_x) - \frac{n-1}{n} \cdot P_{n-2}(k_x) \text{ for } n \geq 2$$

Figure 3:
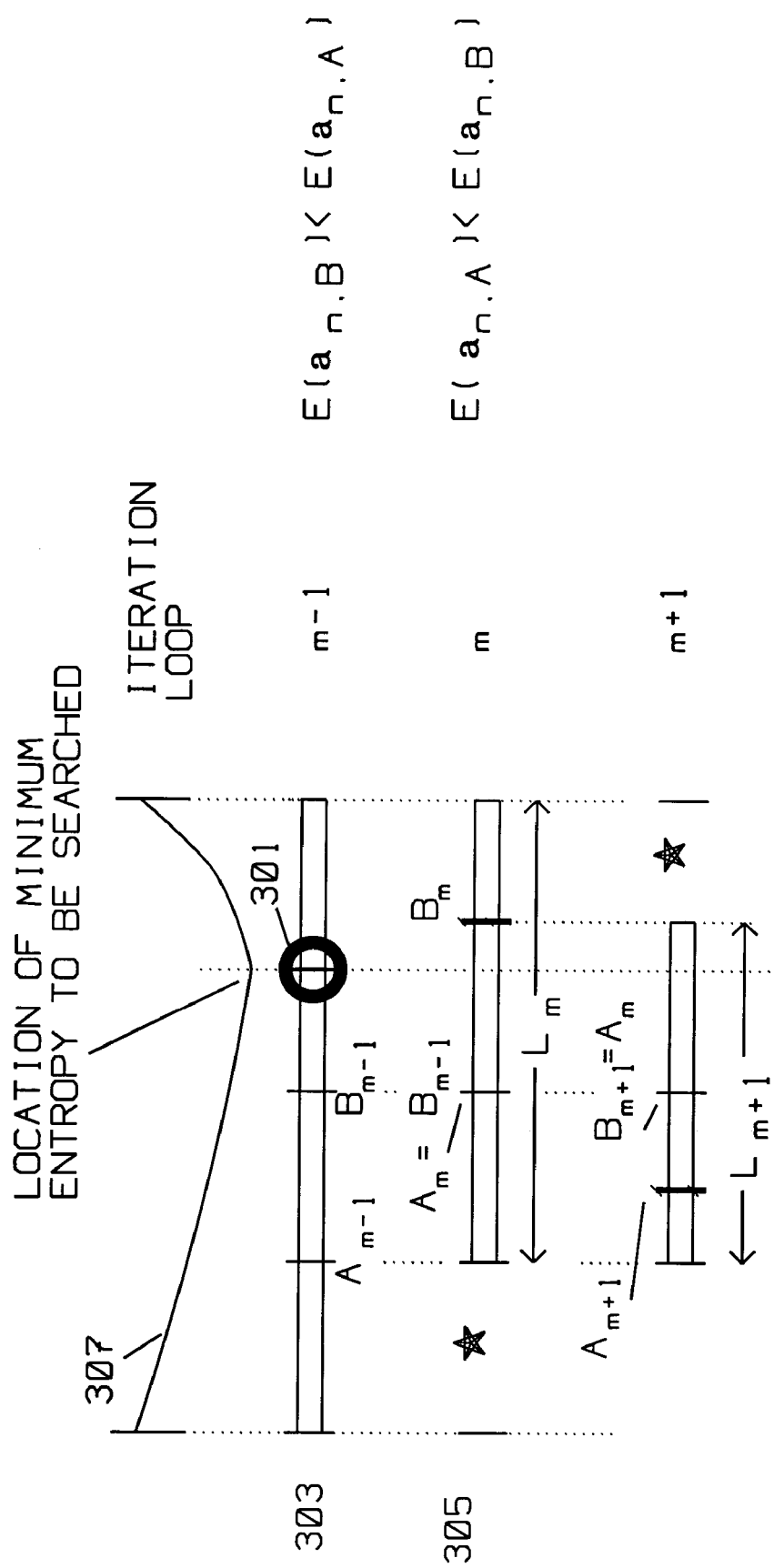
FIG. 3 a method for avoiding locations of minimum entropy applicable to this invention.

3) Golden Section Search (GS)—FIG. 3

The GS search operates in SPA if the cost function is convex in the search interval and it requires computation of only one new cost function in each iteration loop. The region where the minimum point does not belong to is eliminated in each iteration loop, as shown in FIG. 3 by the ★. FIG. 3 shows that evaluated entropy at point A and B are compared to determine the interval to be eliminated on the next iteration loop(s) m−1, m, m+1. Minimum Entropy Point 301 within Entropy Function 307 is the location of the minimum entropy within interval 303, beyond points A and B. Eliminating part of the interval, as shown by interval 305, reduces the search interval by:

$$r = \frac{L_{m-1}}{L_m} = \frac{L_m}{L_{m+1}} = \frac{(1+\sqrt{5})}{2} \approx 1.618043$$

For the initial interval $L_0$ and the last interval $L_M$ when the search process stops, the required number of iterations M is $$M = \frac{\ln\left(\frac{L_0}{L_M}\right)}{\ln(r)}$$

However, it is not desirable to set the number of iterations identical for all terms of different orders because the sensitivity of contrast metric to each order term varies depending on phase error contents. Therefore, in accordance with this invention, the search process stops when the change in entropy between iteration loops reaches less than a preset tolerance, discussed below.

4) Entropy of Image Intensity

Each term of the Legendre polynomial is successively optimized based on observed images sharpness or contrast and there is a need to use proper image quality metric for the parameter optimization in SPA. Instead of using the $p^{th}$ power of intensity as often used, it is suggested to use the entropy of image intensity as a metric for the image contrast of general scenes as described by J. R. Fienup and J. J. Miller in *Aberration Correction by Maximizing Generalized Sharpness Metrics* Journal Opt. Soc. Am., vol 20, pp 609–620, April 2003.

The present invention avoids low order terms trapped at a local minimum, such as minimum entropy 301, when there is a large high order phase error. Local minimum in the entropy function is eliminated in accordance with this invention if smoothed pixel intensity is used for the calculation of entropy for low order terms. Intensity smoothing that eliminates the local minimum and reduces the effect of high order terms is obtained by convolving the image intensity with a rectangular window of proper length, for example 5.

The image quality metric to be used with SPA for the indication of improvement in image sharpness and contrast is as follows. Denote the data in azimuth spatial frequency domain with $Z(k_x,y)$. After applying a phase determined by the $n^{th}$ order parameter $a_n$, complex image data $z_n(x,y)$ is computed from:

$$z_n(x,y) = \text{IFFT}_{kx}[Z(k_x,y) \cdot \exp(j \cdot a_n P_n(k_x))]$$

Next, compute the smoothed pixel intensity by convolving image intensity with a window w of all 1's $$I_n(x,y) = \sum_{\hat{x}} |z_n(\hat{x},y)|^2 \cdot w(x-\hat{x},y)$$

Then, using the normalized intensity $$\hat{I}(x,y) = \frac{|I_n(x,y)|^2}{\sum_y \sum_x |I_n(x,y)|^2}$$

Search for $a_n$ that leads to minimum entropy using:

$$a_{n,opt} = \underset{a_n}{\arg\min}\left[-\sum_y \sum_x \hat{I}_n(x,y) \cdot \ln(\hat{I}(x,y))\right]$$

Detailed Method Steps for SPA Autofocus.

Figure 4:
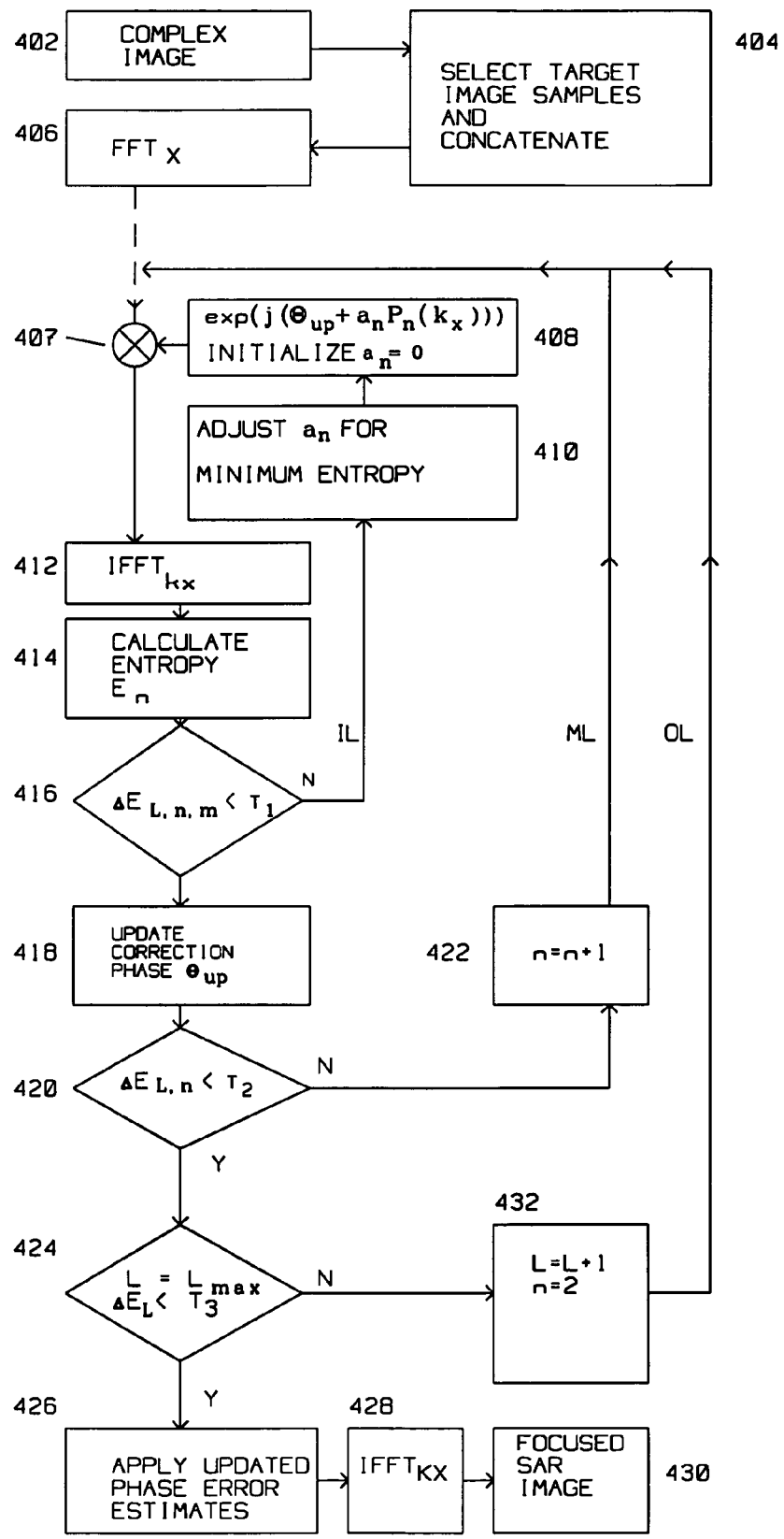
FIG. 4 is a flow diagram of the present invention.

Having discussed mathematical concepts applied to SPA in the sections above, FIG. 4 further details the use of those mathematical concepts in method steps to be followed to focus a radar image using SPA.

In FIG. 4, complex image 402 is first processed in Select Target Image Samples and Concatenate 404. Denote $N_y$ and $N_x$ as the size of the defocused image in range and azimuth respectively. Defocused means the image is roughly motion compensated. Smoothed pixel intensity in azimuth is obtained by convolving the image intensity that is defined by the magnitude squared value of the pixel data with a one dimensional rectangular window in the azimuth direction. Find the azimuth location where the smoothed intensity exceeds a preset threshold, $T_o$. Where the intensity is above the present threshold $T_0$ defines the locations of potential targets to be selected as image samples. Compute the clustered target length and edge points by removing points within the potential target extension. Where there are smeared targets, target extension has a safety margin. Include extra image samples beyond two target edges in azimuth to reduce or avoid edge effects due to wrap-around of the FFT operation. Each identified target is assigned a target ID, range/azimuth position of leading edge, and target length.

Some targets smeared by wind forces have strong intensities, however, related phase errors are not the same due to independent target motion. This targets are de-selected by measuring a contrast metric, entropy. Thus, targets are sorted in order of increasing entropy. Select those targets with small entropy, avoiding those smeared by wind forces. In the alternative, target order as computed using entropy considerations is used to weigh target intensity when entropy is computed later in this method for parameter optimization.

Figure 5:
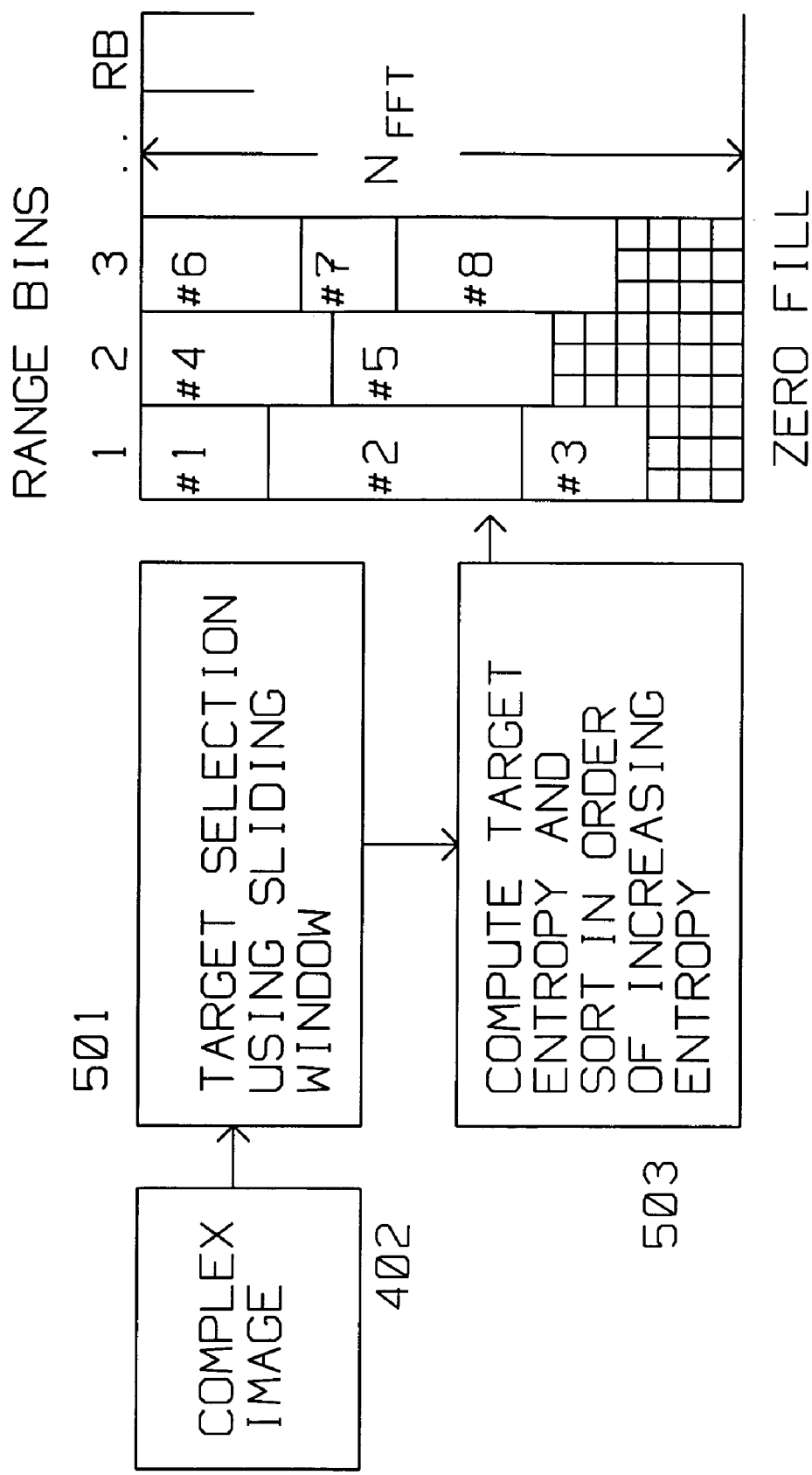
FIG. 5 is shows the use of a sliding window and target entropy computation for selecting, sorting and concatenating good image samples for use with this invention.

The process within 404 is detailed in FIG. 5. Target Selection Using Sliding Window 501 in FIG. 5 smoothes the intensity as discussed above. Target entropy is computed in Compute Target Entropy and Sort in Order of Increasing Entropy 503. Increasing entropy ordered targets are now concatenated up to the length of the desired FFT size, $N_{FFT}$. $N_{FFT}$ length is a power of two or three that is not less than the azimuth image size, $N_x$. The targets are concatenated in order #1, #2, #3 . . . for range bins 1, 2, 3 . . . RB. Zero padding is applied to fill each range bin to its assigned $N_{FFT}$.

Returning to FIG. 4, $FFT_x$ 406 operates on the ordered targets from 404 to convert data from the spatial, image domain to the spatial frequency domain (in the azimuth direction). For an image size of $N_x$, set the length of $N_{FFT}$ to the smallest integer not less than $N_x$ and power of 2 and 3. For compatibility with the FFT function, use a radix 2 and 3 FFT routine. One dimensional $FFT_x$ 406 is performed as many times as the desired number of range bins 1, 2, 3 . . . RB that hold the concatenated complex target image data, e.g. # 1, # 2 # 3 . . . . This operation is not part of the iterations discussed below with respect to the Inner Loop, Mid Loop and Outer loop.

The Inner Loop (IL), Mid Loop (ML) and Outer Loop (OL)

After $FFT_x$ 406, there are three nested iterations (loops) required by SPA to arrive an optimized result. These are the inner loop (IL), the Mid Loop (ML) and the Outer loop (OL) as shown in FIG. 4.

Parameters of the Legendre orthogonal polynomial are optimized by the inner and mid loops for minimum entropy of the selected target image. After the Legendre orthogonal polynomial parameter of the highest order term is determined, the method calls for starting over from the lowest (quadratic) order term. This is necessary because minimum entropy is usually not achieved by a single pass (loop) due to the slight dependency between parameters in entropy calculations. Simulations have shown that acceptable results are obtained after the second or third iteration (loop). The number of required iterations (loops) is also determined by the change in entropy between lowest and highest order terms.

Denote the entropy in outer loop L for the quadratic term as $E_L(a_2)$ and the last order term as $E_L(a_N)$ The iterations of the Outer Loop OL are completed when $$\Delta E_L = E_L(a_2) - E_L(a_N) < T_3 \qquad \text{OL}$$

where $T_3$ is a preset tolerance.

The Mid Loop (ML) searches for the optimum parameters for all order terms. Starting from the $2^{nd}$ order term, the iterations of this loop continue until the change in entropy between two consecutive order terms becomes less than a preset tolerance $T_2$. That is, order increment stops when $$\Delta E_{L,n} = E_L(a_{n-1}) - E_L(a_n) < T_2 \qquad \text{ML}$$

Low order phase errors are generally greater than higher order ones. However, since minimum entropy can be more sensitive to higher order terms, it is not desirable to stop order incrementing too early before reaching a reasonable maximum order. Therefore, order incrementing is stopped if condition in equation ML is met twice in successive orders.

The Inner Loop (IL) searches for the optimum parameters for each order terms using the Golden Search method. As discussed in the Golden Search section, (3) above, parameter of an order term for minimum entropy can be searched sequentially. As shown in FIG. 4, a single iteration loop of IL comprises:

a) phase adjustment (change) from previous iteration 408, defined as $\exp(j(\theta_{up} + a_n P_n(k_x)))$ and Initialize $a_n = 0$. $\theta_{up}$ refers to the updated phase from the iterating loop.

b) Inverse FFT $IFFT_{kx}$ 412 c) Calculate entropy $E_n$ 414 d) Conditional branch 416 to compare $\Delta E_{L,n,m} < T_1$

In this IL loop, for the search of optimum parameter value for order n by GS search, the phase determined by a new parameter value in each iteration is applied to the data in the spatial frequency domain at junction 407. The result is converted to the spatial domain using $IFTT_{kx}$ 412. Denote the initial target data in azimuth spatial frequency domain with $Z(k_x,y)$. For the search of optimum value for the $N_1^{th}$ order term after parameters are all optimized up to the order $(N_1 - 1)$, image $z_n(x,y)$ after phase adjustment with parameter $a_n$ is computed from:

$$z_{N_1}(x, y) = IFFT\left[Z(k_x, y) \cdot \exp\left(j \cdot \left(\sum_{n=2}^{N_1-1} a_{n,opt} P_n(k_x) + a_{N_1} P_{N_1}(k(x))\right)\right)\right]$$

Now, Calculate Entropy 414 is computed as described in section 4, Entropy of Image Intensity, above. Denote $E_L(a_{n,m-1})$ as the entropy at inner iteration loop m-1 and $E_L(a_n,m)$ as the entropy at inner iteration loop m, for order n and outer loop L. The iteration is complete, as shown in Conditional branch 416 comparing Entropy Threshold, when $$\Delta E_{L,n,m} = E_L(a_n,m-1) - E_L(a_n,m) < T_1$$

where preset tolerance $T_1$ is pre-defined, and optimum parameter for order n is $$a_{n,opt} = a_{n,m}$$

The correction phase is updated in Update Correction phase $\theta_{up}$ 418 and transmitted as part of mid loop ML. The iteration for mid loop is completed when conditional branch 420 is followed. Here $$\Delta E_{L,n} < T_2 \qquad \text{ML}$$

where preset tolerance $T_2$ is pre-defined. If the condition in equation ML is not met, the n counter is incremented by 1 in counter increment 422 where n=n+1 for the next iteration.

If the condition in equation ML is met, the outer loop is entered. The iteration for the outer loop is complete when the conditional branch 424 is met. Here, two conditions apply:

$$L = L_{max}$$

and $$\Delta e_l < T_3$$

If the conditions are not met, counter 432 increments L and n by one. where $$L = L + 1$$

and $$n = 2$$

Phase Error Correction

After the outer loops iterations are completed, the final updated correction phase is applied to the data in the spatial frequency domain that was converted from the whole image (not only the selected target data in FIG. 5) in Apply Updated Phase Error Estimates 426.

For the initial complex image data $A(x,\hat{y})$ and the computed correction phase $\Delta\theta(k_k)$, the computational method to obtain the focused image $\hat{A}(x,\hat{y})$ is given by:

$$B(k_x,\hat{y}) = FFT_x\{A(x,\hat{y})\}$$

$$C(k_x,\hat{y}) = B(k_x,\hat{y}) \cdot \exp(j \cdot \Delta\theta(k_x))$$

$$\hat{A}(x,\hat{y}) = IFFT_{kx}\{C(k_x,\hat{y})\}$$

The correction phase is expressed using the parameters computed in loops IL, ML and OL by $$\Delta\theta(k_x) = \sum_{L=1}^{L_{max}} \sum_{n=2}^{N(L)} a_{n,opt,L} P_n(k_k)$$

where L is the index of the outer loop (OL) and n is the index of the mid loop (ML) for all order terms.

$IFFT_{KX}$ performs an inverse FFT on the resulting phase corrected data to generate an auto-focused SAR image 430.

All references cited in this document are incorporated herein in their entirety by reference.

Although presented in exemplary fashion employing specific embodiments, the disclosed structures are not intended to be so limited. For example, although the optimization herein is described in the context of a radar system, it is also applicable for sonar, or similar imaging methods, where an image of scatterers is extracted from coherent summing of a plurality of phase accurate returns.

Those skilled in the art will also appreciate that numerous changes and modifications could be made to the embodiment described herein without departing in any way from the invention.

The invention claimed is:

1. A radar on a moving platform for generating a focused synthetic aperture image of a scene from a sequence of periodic pulse returns from said scene, said pulse returns approximately motion compensated for the motion of said moving platform with respect to said scene, said radar comprising:

analog to digital converter for converting said pulse returns into a digital stream;

a computer for:

receiving said digital stream;

approximately phase aligning said pulse returns from said scene with respect to the motion of said moving platform to generate an initial synthetic aperture image, said initial synthetic aperture image formed from a plurality of pixel intensities $z_n(x, y)$ within a x,y extent of said initial synthetic aperture image;

selecting targets from said initial synthetic aperture image using a sliding window, computing a first entropy for said targets, and sorting said targets using said first entropy to obtain a target list having target elements;

concatenating said target elements to form a data matrix compatible in a dimension with a Fast Fourier Transform;

iteratively computing a phase correction to be applied to said initial synthetic aperture image using an inner loop, a mid loop and an outer loop, said phase correction expressed using an orthogonal polynomial having a plurality n consecutive terms $a_n$, $a_2$ denoting a quadratic term, and $a_N$ denoting a last order term of said consecutive terms of said orthogonal polynomial;

said outer loop, using an L index, calculating an outer loop $E_L(a_2)$ entropy for said quadratic term and an outer loop $E_L(a_N)$ entropy for said last order term, iterations within said outer loop continuing until $E_L(a_2)-E_L(a_N)$ is less than an outer loop tolerance;

said mid loop, using said n as an index, calculating a mid loop entropy $E_L(a_{n-1})$ and a mid loop entropy $E_L(a_n)$, for two of said consecutive order terms, iterations within said mid loop continuing until $E_L(a_{n-1})-E_L(a_n)$ is less than a mid loop tolerance;

said inner loop, using said n as an index, calculating an inner loop entropy $E_L(a_{n,m-1})$ and an inner loop entropy $E_L(a_{n,m})$ said inner loop iteration continuing until $E_L(a_{n,m-1})-E_L(a_{n,m})$ is less than an inner loop tolerance;

applying said phase correction to said initial synthetic aperture image to obtain a focused synthetic aperture image.

2. A radar system as described in claim 1 wherein said inner loop entropy uses a Golden Section search for said inner loop entropy.

3. A radar system as described in claim 2 wherein a location of minimum entropy point is found using said Golden Section Search.

4. A radar system as described in claim 3 wherein said initial synthetic aperture image formed from said plurality of pixel intensities $z_n(x, y)$ is smoothed by convolving said plurality of pixel intensities with a window of 1's, thereby obtaining a smoothed pixel intensity, $I_n(x,y)$.

5. A radar system as described in claim 4 wherein said smoothed pixel intensity is used to compute a normalized intensity $\hat{I}(x,y)$ from $$\hat{I}(x, y) = \frac{|I_n(x, y)|^2}{\sum_y \sum_x |I_n(x, y)|^2}.$$

6. A radar system as described in claim 5 wherein said normalized intensity is used to compute optimal coefficients $a_{n,opt}$ for said orthogonal polynomial to obtain a minimum image entropy using:

$$a_{n,opt} = \underset{a_n}{\operatorname{argmin}}\left[-\sum_y \sum_x \hat{I}_n(x, y) \cdot \ln(\hat{I}(x, y))\right].$$

7. A method for autofocusing an initial synthetic aperture image of a scene acquired by a radar on a moving platform from a sequence of periodic pulse returns from said scene, said pulse returns approximately motion compensated for motion of said moving platform with respect to said scene, comprising the steps of:

converting said pulse returns into a digital stream;

approximately phase aligning said pulse returns from said scene with respect to said motion of said moving platform to generate said initial synthetic aperture image, said initial synthetic aperture image formed from a plurality of pixel intensities $z_n(x,y)$ within a x,y extent of said initial synthetic aperture image;

selecting targets from said initial synthetic aperture image using a sliding window;

computing a first entropy for said targets;

sorting said targets using said first entropy to obtain a target list having target elements;

concatenating said target elements to form a data matrix compatible in a dimension with a Fast Fourier Transform;

iteratively computing a phase correction to be applied to said initial synthetic aperture image using an inner loop, a mid loop and an outer loop, said phase correction expressed using an orthogonal polynomial having a plurality n consecutive terms $a_n$, $a_2$ denoting a quadratic term, and $a_N$ denoting a last order term of said consecutive terms of said orthogonal polynomial;

said outer loop, using an L index, calculating an outer loop $E_L(a_2)$ entropy for said quadratic term and an outer loop $E_L(a_N)$ entropy for said last order term, iterations within said outer loop continuing until $E_L(a_2)-E_L(a_N)$ is less than an outer loop tolerance;

said mid loop, using said n as an index, calculating a mid loop entropy $E_L(a_{n-1})$ and a mid loop entropy $E_L(a_n)$, for each of two of said consecutive order terms of said orthogonal polynomial, iterations within said mid loop continuing until $E_L(a_{n-1})-E_L(a_n)$ is less than a mid loop tolerance;

said inner loop, using said n as an index, calculating an inner loop entropy $E_L(a_{n,m-1})$ and an inner loop entropy $E_L(a_{n,m})$ said inner loop iteration continuing until $E_L(a_{n,m-1})-E_L(a_{n,m})$ is less than an inner loop tolerance;

applying said phase correction to said initial synthetic aperture image to obtain a focused synthetic aperture image.

8. A method as described in claim 7 wherein said inner loop entropy uses a Golden Section search for computing said inner loop entropy.

9. A method as described in claim 8 wherein a location of minimum entropy point is found using said Golden Section Search.

10. A method as described in claim 9 wherein said initial synthetic aperture image formed from said plurality of pixel intensities $z_n(x,y)$ is smoothed by convolving said plurality of pixel intensities with a window of 1's, thereby obtaining a smoothed pixel intensity, $I_n(x,y)$.

11. A method as described in claim 10 wherein said smoothed pixel intensity is used to compute a normalized intensity $\hat{I}(x,y)$ from $$\hat{I}(x, y) = \frac{|I_n(x, y)|^2}{\sum_y \sum_x |I_n(x, y)|^2}.$$

12. A method as described in claim 11 wherein said normalized intensity is used to compute optimal coefficients $a_{n,opt}$ for said orthogonal polynomial to obtain a minimum image entropy using:

$$a_{n,opt} = \operatorname*{argmin}_{a_n}\left[-\sum_y \sum_x \hat{I}_n(x, y) \cdot \ln\!\left(\hat{I}(x, y)\right)\right].$$

* * * * *